United States Patent [19]
Turner et al.

[11] Patent Number: 5,906,053
[45] Date of Patent: May 25, 1999

[54] ROTARY CUTTING BLADE HAVING A LASER HARDENED CUTTING EDGE AND A METHOD FOR MAKING THE SAME WITH A LASER

[75] Inventors: Darrel L. Turner, Reeseville; Richard L. Wilkey, Hartland; Jeffrey O. Russell, Madison, all of Wis.

[73] Assignee: Fisher Barton, Inc., Watertown, Wis.

[21] Appl. No.: 08/815,042

[22] Filed: Mar. 14, 1997

Related U.S. Application Data

[60] Provisional application No. 60/013,408, Mar. 14, 1996.

[51] Int. Cl.$^6$ .................................. B26B 9/00; B21K 5/00
[52] U.S. Cl. .................................. 30/347; 30/353; 30/357; 76/115
[58] Field of Search ............................. 30/347, 348, 353, 30/349, 357; 76/101.1, 112, 115, 107.1; 83/116

[56] References Cited

U.S. PATENT DOCUMENTS

| | | | |
|---|---|---|---|
| 2,869,311 | 1/1959 | Beeston, Jr. | 30/349 |
| 3,882,579 | 5/1975 | Peacock | 76/115 |
| 3,988,955 | 11/1976 | Engel et al. | |
| 4,109,127 | 8/1978 | Frungel | 219/7.5 |
| 4,147,570 | 4/1979 | Corbo et al. | 148/144 |
| 4,151,014 | 4/1979 | Charschan et al. | 148/13 |
| 4,459,458 | 7/1984 | Vetsch et al. | |
| 4,533,812 | 8/1985 | Lorenz | 76/115 |
| 5,114,499 | 5/1992 | Kusunoki | 148/512 |
| 5,131,957 | 7/1992 | Epstein et al. | 148/565 |
| 5,145,530 | 9/1992 | Cassady | 148/565 |
| 5,181,321 | 1/1993 | Gouttebarge | 30/357 |
| 5,251,514 | 10/1993 | Rhodarmer et al. | 76/115 |
| 5,297,637 | 3/1994 | Rowlett | 30/347 |
| 5,394,612 | 3/1995 | Wolfington | 30/347 |
| 5,446,258 | 8/1995 | Mordike | 219/121 |
| 5,447,580 | 9/1995 | Semiatin et al. | 148/565 |
| 5,575,185 | 11/1996 | Cox et al. | 76/107.1 |

*Primary Examiner*—Hwei-Siu Payer
*Attorney, Agent, or Firm*—Michael Best & Friedrich LLP

[57] ABSTRACT

A rotary cutting blade including an elongated body made of steel and having opposite ends, a leading edge extending from each opposite end, an upper surface, a lower surface and a cutting surface extending between the upper and lower surfaces along a portion of the leading edge, and a laser hardened portion extending from an opposite end of the body along the lower surface and the leading edge, the laser hardened portion having a thickness extending toward the upper surface and to the cutting edge.

23 Claims, 1 Drawing Sheet

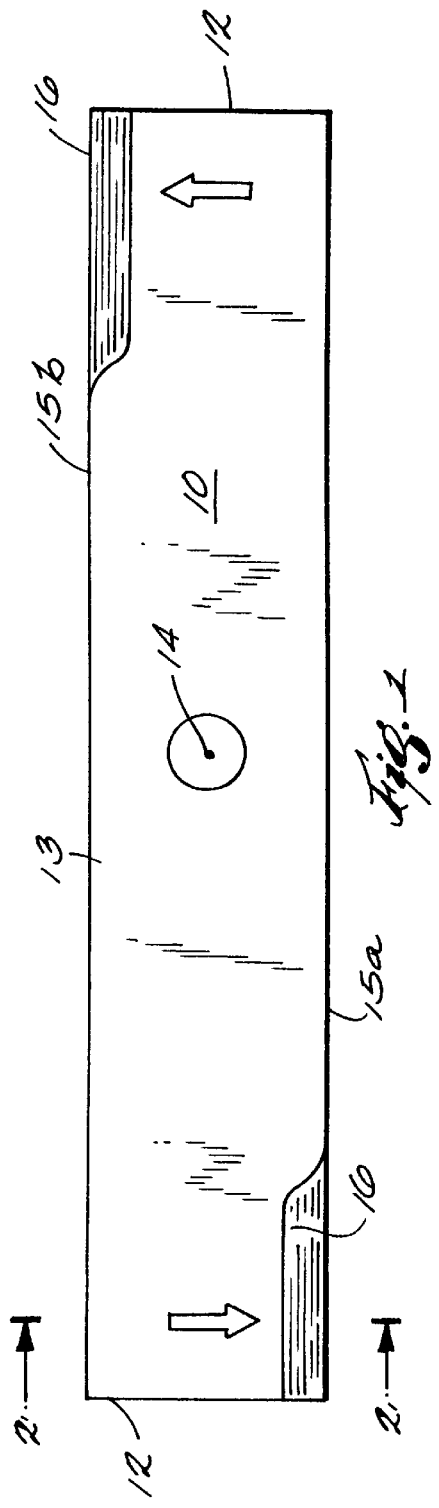

ROTARY CUTTING BLADE HAVING A LASER HARDENED CUTTING EDGE AND A METHOD FOR MAKING THE SAME WITH A LASER

This application claims benefit of USC Provisional Application Ser. No. 60/013,408, filed Mar. 14, 1996.

BACKGROUND OF THE INVENTION

1. Technical Field

The invention relates generally to rotating cutting blades and methods for manufacturing rotary cutting blades. More particularly, the invention relates to cutting blades and methods for manufacturing cutting blades which provide cutting edges having a high hardness and which have necessary toughness to sustain high-energy impacts.

2. Related Prior Art

Rotary cutting blades are used in machinery such as lawn mowers, rotary cutting machines and agricultural equipment. Such rotary cutting blades include lawn mower blades, disc mower blades and straw chopper blades, each of which may have a cutting edge at one end of the blade. Such equipment normally includes one or more rotating blades driven at high speeds. Rotating cutting blades should have a sharp cutting edge at the leading edge of the outer periphery of the blade, and are required to withstand high speed impact with objects that may be encountered, including rocks, pieces of metal and other hard objects. More particularly, the rotating blades must be able to withstand such impact without shattering or otherwise fracturing.

Cutting blades are subject to wear by the fiber-like material being cut and are also subject to wear by sand and grit encountered by the blade. Increasing the hardness of the cutting blades improves resistance to wear due to normal cutting conditions. However, increasing the hardness of the cutting blade also tends to increase the brittleness of the blade and reduces the capacity of the blade to withstand impacts with hard objects. Further, cutting edges are subject to deformation by larger pebbles, rocks and other debris. This deformation has the effect of dulling the cutting edge without necessarily removing material from the blade. A dull cutting edge may be perceived as having been worn dull. Once the blade is perceived as dull, the user may sharpen and remove material from the blade, thereby reducing the life of the blade. Also, a dull cutting edge does not break the fiber off as cleanly and reduces the quality of cut.

Rotating blades used in lawn mowers are commonly required to comply with national standards, including standards promulgated by ANSI. In one such test, a blade is rotated at high speed in a test housing. Once the blade is rotating at high speed in a steady state, a metal shaft or post is quickly moved into the path of the rotating blade. The leading edge of the blade impacts the post and is stopped suddenly. In order to pass this test, the cutting blade must remain intact upon impact, i.e., pieces of the blades are not permitted to fly from the blade.

Another test that may be used in the production of rotary blades and which may indicate effectiveness of a cutting blade hardening process is a Charpy v-notch impact test according to ASTM standard E-23.

One way of manufacturing a rotary blade to meet the various design criteria is to heat treat the cutting blade after it is formed. It is commonly known to harden a rotary blade using a variety of methods. One such method is heat treating the entire body of the blade. Such heat treating processes, using an ordinary spring grade of carbon steel, can result in a blade having a hardness of 40–45Rc. Some heat treating processes can result in a blade having a hardness of 47Rc. However, cutting blades having a hardness of 47Rc or greater generally produce a blade that is too brittle to withstand impact.

Another known hardening process involves the spraying or depositing of tungsten carbide on the bottom surface of a rotary blade adjacent the leading or cutting edge. The application of such a coating to a blade can result in a surface hardness of approximately 70Rc. Such a spray-bonded coating is approximately 0.006 inches thick and results in a region of the blade being extremely hard with the remainder of the blade having a hardness of 40–45Rc after conventional heat treating.

A problem with spray-bonding a blade with tungsten carbide is that sand and grit abrade the spray-bonded surface. Fiber material such as grass being cut does not wear away the spray-bonded material, but sand and grit fractures the spray-bonded material and erodes the material away. Once the spray-bonded coating erodes, the remaining, unprotected cutting surface tends to quickly dull as it is not sufficiently hard. One method of addressing this problem is to pre-treat the blade with a matrix material to improve the bonding between the tungsten carbide and the steel blade. The matrix material has approximately a 50Rc and acts as an interface between the coating and the blade. However, this matrix material may also provide a weak area in the leading edge of the blade. Also, the sprayed on material and matrix can include voids and defects and is relatively brittle. Also, spray-bonding does not increase the life of a standard heat-treated rotary blade. Such spray-bonding of tungsten material is relatively expensive and can be difficult to obtain on an industrial level.

SUMMARY OF THE INVENTION

The invention provides an improved rotary blade and a method for making such an improved rotary blade. More specifically, the invention provides a cutting blade which has a high degree of toughness so as to absorb the energy of impacts, and provides a cutting region having a high degree of wear resistance. The invention provides a blade with more resistance to edge dulling from deformation since the edge strength is significantly higher. The invention also provides for continued improved edge retention even after resharpening several times.

In one embodiment, the invention provides a cutting blade having a leading edge that is treated and hardened by exposure to a beam of laser radiation. The depth or thickness of laser hardening from the surface exposed to the laser beam should be more than about 0.010 inches to have enough mass to resist deformation or peening of the leading edge of the blade.

In another embodiment, the invention provides a method for manufacturing cutting blades having laser hardened cutting edges which achieve these advantageous characteristics.

More particularly, in one embodiment, the invention provides a method for manufacturing a blade having a wear-resistant and deformation resistant cutting edge and also maintains a degree of toughness or impact resistance. The blade is formed through conventional processing such as, for example, stamping. After having been formed, the blade is hardened by first heat treating the entire blade to enhance the wear characteristics of a particular region or cutting edge and cutting surface on the leading edge of the peripheral ends of the blade. More particularly, the invention provides a method of manufacturing a steel rotary cutting blade having a laser hardened cutting surface, the method including the steps of providing a steel work piece, forming the work piece into a cutting blade having a cutting surface, heat treating the entire cutting blade, and exposing a portion of the cutting blade to a beam of laser radiation whereby a portion of the cutting surface is hardened.

Heat treatment of the entire body of a blade results in a blade having a surface hardness in the range of approximately 35 to 54Rc depending on part material, thickness, geometry and the heat treating process used. Such a blade has a relatively hard surface but retains sufficient impact resistance for use as a lawn mower blade or other rotating cutting blade. After the body of the blade is hardened, the cutting surface and cutting edge is hardened, the cutting surface and cutting edge is hardened through application of a laser.

This procedure provides several advantages. In particular, the process can be automated and used to treat a high volume of work pieces. No quenching subsequent to the hardening is necessary, and a relatively discrete area of the blade can be hardened. This is a particular advantage over other methods of hardening such as hardening by induction heating.

Another embodiment of the invention provides a method of hardening a portion of a steel work piece, the method including the steps of heat treating the work piece; providing a beam of laser radiation; and exposing a portion of the work piece to the laser beam to quickly heat the portion of the work piece.

Other features and advantages of the invention will become apparent to those skilled in the art upon review of the following detailed description, claims and drawings.

DESCRIPTION OF THE DRAWINGS

FIG. 1 is a top view of a rotary cutting blade embodying the invention.

FIG. 2 is an enlarged, cross-sectional view taken along line 2—2 in FIG. 1.

FIG. 3 is a schematic view illustrating an apparatus for providing a beam of laser radiation for treating a work piece such as the cutting blade in FIG. 1.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

The Work Piece

FIG. 1 illustrates a metal work piece, such as a rotary cutting blade 10, which can be hardened through the application of a laser beam moving along the portion of the work piece. More particularly, the rotary blade 10 has opposite ends 12, a body 13 extending between the ends 12, and has extending therethrough a centrally located axis of rotation 14. In FIG. 1, for the purpose of illustration, the anticipated direction of rotation of the blade 10 about the axis 14 is shown as being counterclockwise such that the blade 10 provides first and second leading edges 15a and 15b. Adjacent each of the respective ends 12 of the blade 10 is a cutting surface 16 which extends radially inwardly from the end 12 of the blade 10 along a portion of the respective leading edge 15a, 15b of the blade 10. More particularly, and with reference to FIG. 2, the blade 10 has a top surface 18 and a bottom surface 20, and the cutting edge 16 extends from the bottom surface 20 upward and backward (with respect to the direction of rotation) from the leading edge 15a, 15b to the top surface 18. The intersection of the cutting surface 16 and the bottom surface defines a cutting edge 22 which extends along the length of the cutting surface 16.

The blade 10 is made of a spring grade of steel, and preferably is an AISI 10B38 grade of steel, an alloy having a content in the range of 0.003% to 0.0005% boron which, as discussed below, is believed to enhance the hardenability of the blade 10. However, other grades of steel can also be successfully used as material for the cutting blade 10. For example, the blade 10 can be made of any of a group of materials including the following grades of steel: AISI 5140 through 5160; 51B35 through 51B60; 5135H through 5160H; 6150 and 6150H; 4140 through 4161; 4141H through 4161H; 9255 through 9260; 9255H through 9260H; 1541 through 1566; 15B35H through 15B62H; 1037 through 1095; and 10B37 through 10B60, as well as other equivalent chemistries.

The blade 10 is formed through conventional fabrication processing such as, for example, stamping, coining, shearing or milling or by a combination of these processes according to the design requirements of the blade 10 or other work piece.

After having been formed and/or machined, the blade 10 can be further fabricated through hardening, such as by heat treating the body 13 of the blade 10. Any one of several heat treating methodologies can be successfully used to harden the body 13 of steel material, and preferably the body 13 of steel is treated so as to attain a hardness of 35Rc to 54Rc.

Among the heat treating processes that can be successfully used for heat treating the entire body 13 are: austempering the body 13; austempering and tempering, martempering or quenching; and tempering. Heat treatment of the entire body 13 of a blade 10 made of the above described AISI 10B38 steel results in the blade 10 having a hard surface but retains sufficient impact resistance and bending resistance for use as a lawn mower blade.

Depending upon material and the configuration of the blade 10, the fabrication of the blade 10 may entail heat treating only portion of the body 13, such as by induction heating. Also, as discussed below, the fabrication of the blade 10 may include only one of the forming steps or the heat treating steps, or both the forming and heat treating steps. Also, the laser hardening process described below may be applicable to work pieces such as the blade 10 wherein the heat treating step(s) are completed before forming and machining.

Preferably, the material for the body 13 is a spring steel sold under the name MARBAIN having the above-described AISI 10B38 composition. The composition and treating processes for this preferred material are disclosed in co-pending U.S. patent application Ser. No. 08/532,046 which is titled "High Hardness Boron Steel Rotary Blade" which was filed on Sep. 21, 1995, and which is incorporated herein by reference.

Thus, fabrication of the blade 10 may include any combination of the steps of forming and heat treating. In addition, heating of the body need not entail heat treating of the entire body; localized heat treating may be suitable for some blade designs. Also, the laser hardening process may have effectiveness in localized hardening even without prior heat treating. For example, the use of the above specified 10B38 material may afford the successful application of the laser hardening process without the need for heat treating during the fabrication of the blade 10.

In the preferred embodiment of the invention, however, after the body 13 is fabricated, a portion of the blade 10 is subjected to a laser beam hardening process to enhance the wear characteristics of the cutting edge 22 and cutting surface 16. Specifically, the cutting surface 16 and cutting edge 22 is hardened through application of a laser.

The Laser Apparatus

A laser 26 (shown schematically in FIG. 3) typically, but not limited to, $CO_2$ or Nd:YAG can be used. While other laser apparatus are believed to be suitable, a 6 KW $CO_2$ laser operating at 85% power can be successfully used. The beam 28 of the laser 26 is focused to a suitable size and shape for the laser and work piece application. The work piece 10 is moved relative to the laser beam 28 or the beam 28 may be moved relative to the work piece 10. Of course, a hybrid of the two may be most suitable. While the relative speed and pattern of travel between the work piece 10 and the laser beam 28 are variables that may be optimized for the laser hardening of the work piece 10, in a preferred embodiment of the invention, the beam of laser radiation 28 is generally rectangular in cross section such that the beam 28 is approximately ⅜ inch wide and has a relatively narrow thickness or depth on the order of less than 1/10 inch. The appropriate rate of travel of the beam 28 along the work piece will depend on the thickness of the beam 28, the depth or thickness of the work piece 10 to be hardened, and the material to be used. However rates of travel of 45–100 inches per minute can be successfully used. As discussed below, it is believed that the relatively rapid heating and immediately following cooling of the portion hardened by exposure to beam 28 the laser is an important aspect of the invention. Accordingly, the relationships of the width or swath of the beam 28, the thickness of the beam 28 and the rate of travel are interdependent factors in optimizing the laser hardening process.

Treatment of the Blade with the Laser

The portions of the blade 10 which should be hardened for use as a lawn mower blade are the portions of the bottom surface 20 of the blade 10 underlying the cutting surfaces 16. It should be understood, however, that within the parameters set forth below, any portion of the blade 10 can be successfully hardened through application of the laser. For example, the surfaces 18 and 20 from the cutting edge 22 to the trailing edge of the blade 10 work piece are susceptible to erosion wear. Laser hardening the surfaces 18 and 20, in particular the outer one inch near the end 12, improves the life and discharge performance of the blade 10.

More particularly, the portion of the blade 10 to be hardened through application of the laser beam 28 is indicated by a dotted line and reference numeral 24 in FIG. 2. The region 24 extends from the end 12 of the blade 10 to a depth D of approximately 0.010–0.040 of an inch and has a width w of approximately 0.5 of an inch extending from the cutting edge 22 toward the trailing edge of the blade 10. As shown in FIG. 2 and for reasons explained below, the thickness or depth D of the laser hardened region 24 of the blade 10 may be greater in that portion of the blade 10 adjacent the cutting edge 22 where the material thickness is thinner than in the central portions of the blade 10.

To harden the region 24, the laser beam 28 is focused onto the bottom surface 20 at the appropriate distance inwardly from the edge 22 so that the beam 28 travels within the area of surface 20 to be hardened. The beam 28 is moved, or the work piece 10 is moved relative to the laser beam 28, in a direction either toward or away from the axis 14 along the extent of the bottom surface 20 defined by region 24 at the rate appropriate for the laser and part requirements.

As the beam 28 moves along the undersurface 20, the affected material of the blade 10 is heated so as to have a temperature believed to be in the range of 1,400–1,900° F. The temperature, and time at temperature, must be sufficient to form austenite. Austenite is a solid solution of carbon and iron, and the formation of austenite is needed to make the transformation of the blade material to a hard structure upon quenching. Because the laser beam 28 is relatively narrow in relation to the direction of movement of the beam along the undersurface 20, the beam 28 is therefore applied to a particular section of the blade 10 for a relatively short period of exposure. After the beam 28 passes a section of the work piece 10, heat in the particular heated section of the blade 10 rapidly dissipates into the surrounding material, and the heated material, austenite, cools rapidly to form hard martensite or martensite and carbide.

The portions of the blade 10 adjacent the heated portion 24 of the blade 10 act as a heat sink drawing energy from the heated area. The relatively large mass of the blade 10 adjacent to heated region 24 draws the thermal energy away at a high rate, effectively quenching the heated volume 24. This effect is believed to cause a high degree of hardness as well as a high degree of toughness in the material. The hardness of the laser hardened region 24 using the above described processing is in the range of 58Rc–70Rc, which is higher than the hardness that can be achieved through conventional heat treating methods.

As to the portion of the blade 10 adjacent the cutting surface 16, because there is less material to absorb thermal energy from the laser beam 28 in that portion, the depth of the hardened material is somewhat greater adjacent the cutting surface 16 than in locations spaced away from the leading edge 15a, 15b of the blade 10. This result advantageously provides a cutting edge 22 and cutting surface 16 that is hardened by application of the laser beam 28 to the undersurface 20.

Because the prior microstructure is tempered martensite or a form of bainite and because this structure is heated rapidly and thereafter quenched without delay, the new structure has a very fine grain. It is believed this fine grain structure results in higher toughness, relative to hardness, than could be achieved with conventional heat treat processes. Thus, the following steps can be used to harden a portion of a steel work piece: first, forming a steel work piece into the desired shape; heat treating the work piece; providing a beam of laser radiation; and exposing a portion of the work piece to the laser beam to quickly heat the portion of the work piece.

In view of the foregoing, the cutting blade 10 including the laser hardened cutting surfaces 16, 20 can be manufactured using the following steps: (a) providing a steel work piece; (b) forming the work piece into a cutting blade having a cutting surface; (c) heat treating the entire cutting blade; and (d) exposing a portion of the cutting blade to a beam of laser radiation whereby a portion of the cutting surface is hardened.

Because the laser hardened area 24 is not an added layer of wear resistant material, as is the case with a spray-bonded coating or hardfacing, it is an integral portion of the blade. In this regard, there is a narrow heat affected zone or boundary between the laser hardened area and the material adjacent the hardened zone. This heat affected zone is slightly softer than either the body 13 of the blade 10 or the laser hardened area 24 and is believed to be ductile enough to prevent separation. However, it is also believed the zone boundary is narrow enough and strong enough to support the hard laser hardened material 24. Without support, even though somewhat ductile, the material in the laser hardened region 24 would bend and fracture.

No pre-heating of the blade 10 is necessary for treatment of the blade 10 with the laser 26. However, in some applications, the laser beam 28 may be reflected away from the surface of the work piece 10 to be hardened to the degree the work piece surface is reflective. For example, a highly polished blade steel would reflect a large percentage of the beam 28 and result in very little energy input to heat the steel. Reflectivity is negligible, however, when the work piece 10 is heat treated to produce a black oxide layer on the surface. Such an oxide layer can be formed, for example by salt austempering. In this heat treat hardening process, water may be added to the salt quench to aid in achieving a high quench rate. The part surface will form a very thin, slightly rough black iron oxide layer in the presence of the steam produced by quenching. This black oxide layer greatly reduces opportunity for beam reflection and, as a result, tends to increase the effectiveness of the laser hardening process. This black oxide layer also reduces cost by eliminating a separate operation to blacken or otherwise condition the blade surface for laser hardening.

Also, no quenching of the blade 10 is necessary after the application of the laser hardening process. Although very thin blades with low self quenching mass may need assisted quenching. Low hardenability material will also benefit from assisted quenching if a deep laser hardened area is needed. The process can be easily automated, and no special handling of the blades is required either before or after the laser hardening process.

Because this laser hardening process is applied to a fairly small portion of the blade 10, the remainder of the blade 10 retains a high toughness and can absorb the energy of a high-speed impact with a hard object. Also, the region of the blade 10 hardened by the laser hardening process is highly resistant to the wearing condition of normal mowing, cutting and chopping, and is also impact resistant.

Various other features and advantages of the invention are set forth in the following claims:

We claim:

1. A rotary cutting blade comprising
an elongated body made of steel and having opposite ends, a leading edge extending from one of the opposite ends, an upper surface, a lower surfaces, and a cutting surface extending between the upper and lower surfaces along a portion of the leading edge, and a laser hardened portion extending from the one opposite end of the body along the lower surface and along the leading edge, the laser hardened portion having a thickness extending toward the upper surface and to the cutting surface, wherein the cutting surface and the lower surface intersect to define a cutting edge, and wherein the laser hardened portion has an increased thickness adjacent the cutting edge.

2. A rotary cutting blade comprising an elongated body made of steel and having an upper surface, a lower surface, and at least one cutting surface extending between the upper and lower surfaces, wherein a portion of the body is heat treated, and wherein a portion of the heat treated portion is laser hardened, the laser hardened portion extending along the lower surface and having a thickness extending toward the upper surface and to the cutting surface.

3. The blade of claim 1 wherein the laser hardened portion has a depth of up to 0.040 of an inch from the lower surface.

4. The blade of claim 1 wherein the hardness of the laser hardened portion is in the range of 58Rc to 70Rc.

5. The blade of claim 1 wherein the laser hardened portion has a thickness in the range of 0.010 to 0.040 of an inch.

6. The blade of claim 1 wherein the cutting surface and the lower surface intersect to define a cutting edge, and wherein the laser hardened portion has a width of approximately ½ inch extending from the cutting edge.

7. The blade of claim 1 wherein the hardness of the body is in the range of 35Rc through 54Rc in the areas other than the laser hardened portion.

8. The blade of claim 1 wherein the cutting surface and the lower surface intersect to define a cutting edge, and wherein the laser hardened portion has an increased thickness adjacent the cutting edge.

9. The blade of claim 1 wherein the steel material which is laser hardened is from a group consisting of AISI 5140 through 5160, 51B35 through 51B60, 5135H through 5160H, 6150 and 6150H, 4140 through 4161, 4141H through 4161H, 9255 through 9260, 9255H through 9260H, 1541 through 1566, 15B35H through 15B62H, 1037 through 1095, 10B37 through 10B60.

10. The blade of claim 1 wherein the body has opposite ends, a leading edge extending from each of the opposite ends, and a pair of cutting surfaces extending between the upper and lower surfaces along respective portions of each of the leading edges, and wherein the body includes a laser hardened portion extending along the lower surface and along each of the leading edges, the laser hardened portions having a thickness extending toward the upper surface and to the cutting surface.

11. The blade of claim 1 wherein the entire body is heat treated.

12. The blade of claim 1 wherein the cutting surface intersects the lower surface and the upper surface and is continuous therebetween.

13. A method of manufacturing a steel rotary cutting blade having a laser hardened cutting surface, the method comprising:
   (a) providing a steel work piece;
   (b) fabricating the work piece into a cutting blade having a cutting surface, the fabricating step including heat treating a portion of the work piece; and
   (c) exposing a portion of the heat treated portion to a beam of laser radiation whereby a portion of the cutting surface is laser hardened.

14. The method of claim 13 wherein, in the fabricating steps, the portion of the work piece is heat treated to provide the cutting blade with a hardness of 35Rc to 54Rc.

15. The method of claim 13 wherein the fabricating step includes heat treating the entire cutting blade.

16. The method of claim 13 wherein the fabricating step provides the cutting blade with a layer of oxide.

17. The method of claim 13 wherein the exposing step provides the laser hardened portion with a hardness in the range of 58 to 70Rc.

18. The method of claim 13 wherein the cutting blade has a lower surface intersecting the cutting surface to define a cutting edge, and wherein the exposing step provides the laser hardened portion having an increased thickness adjacent the cutting edge.

19. A method of hardening a portion of a steel work piece, the method comprising:
   (a) fabricating a work piece, the fabricating step including heat treating a portion of the work piece;

(b) providing a beam of laser radiation; and
(c) exposing a portion of the heat treated portion of the work piece to the laser beam to quickly heat the portion of the work piece.

20. The method of claim 19 wherein the exposing step includes the step of moving the beam relative to the surface being exposed to the beam.

21. The method of claim 19 wherein the fabricating step includes the step of providing a layer of oxide on the work piece.

22. The method of claim 19 wherein the work piece has a lower surface and a cutting surface intersecting the lower surface to define a cutting edge, and wherein the exposing step provides the laser hardened portion having an increased thickness adjacent the cutting edge.

23. The method of claim 19 wherein the fabricating step includes heat treating the entire work piece.

* * * * *